US006025457A

United States Patent [19]
Ohno et al.

[11] Patent Number: 6,025,457
[45] Date of Patent: Feb. 15, 2000

[54] MOLTEN-SALT TYPE POLYELECTROLYTE

[75] Inventors: Hiroyuki Ohno, Tokyo; Kaori Ito, Kanagawa, both of Japan

[73] Assignee: Shikoku Chemicals Corporation, Kagawa, Japan

[21] Appl. No.: 08/997,047

[22] Filed: Dec. 23, 1997

[51] Int. Cl.$^7$ .......................... C08G 73/18; C08L 33/00; C08K 5/00
[52] U.S. Cl. .......................... 528/170; 528/171; 528/172; 528/174; 528/175; 528/310; 528/314; 528/322; 528/327; 528/337; 526/225; 526/287; 526/303.1; 526/307.2; 526/317.1; 526/328; 525/218; 525/221; 525/262; 525/278; 525/279; 525/282
[58] Field of Search .................... 528/310, 322, 528/170, 175, 171, 174, 327, 172, 33.7, 314; 526/225, 287, 303.1, 307.2, 317.1, 328; 525/218, 221, 262, 278, 279, 282

[56] References Cited

U.S. PATENT DOCUMENTS

| | | | |
|---|---|---|---|
| 3,706,672 | 12/1972 | Martin et al. | 252/156 |
| 4,049,608 | 9/1977 | Steckler et al. | 260/29.6 SQ |
| 4,090,931 | 5/1978 | Motani et al. | 204/98 |
| 4,292,227 | 9/1981 | Michaels et al. | 210/647 |
| 4,463,071 | 7/1984 | Gifford et al. | 429/194 |
| 4,463,072 | 7/1984 | Gifford et al. | 429/194 |
| 5,102,751 | 4/1992 | Narang et al. | 429/192 |
| 5,194,490 | 3/1993 | Suga et al. | 524/755 |
| 5,358,620 | 10/1994 | Golovin et al. | 204/421 |

FOREIGN PATENT DOCUMENTS

| | | | |
|---|---|---|---|
| 60-133669 | 7/1985 | Japan | H01M 10/36 |
| 60-133670 | 7/1985 | Japan | H01M 10/36 |
| 60-136180 | 7/1985 | Japan | H01M 10/40 |
| 8-34770 | 3/1996 | Japan | H01M 10/40 |

OTHER PUBLICATIONS

*Polymer Preprints, Japan* vol. 46 No. 3, The Society of Polymer Science, Japan, May 24, 1997.

*Primary Examiner*—P. Hampton-Hightower
*Attorney, Agent, or Firm*—Sughrue, Mion, Zinn, MacPeak & Seas, PLLC

[57] ABSTRACT

Novel molten-salt type polyelectrolytes are disclosed which contain as an essential ingredient a molten salt polymer obtained by reacting an imidazolium derivative, such as a 1,3-dialkylimidazolium halide, 1,2,3-trialkylimidazolium halide, 1-vinyl-3-alkylimidazolium halide, or 1-vinyl-2,3-alkylimidazolium halide, with an acid monomer, a poly (vinylsulfonamide), trifluoromethanesulfonimide, or the like. The electrolytes show high ionic conductivity at room temperature and have excellent stability to temperature fluctuations and excellent mechanical properties.

16 Claims, 11 Drawing Sheets

MOLTEN-SALT TYPE POLYELECTROLYTE

FIELD OF THE INVENTION

The present invention relates to polyelectrolytes which are molten salts at room temperature. More particularly, the present invention relates to ionically conductive polyelectrolytes especially excellent in stability to temperature fluctuations and in mechanical properties.

BACKGROUND OF THE INVENTION

A mixture of inorganic compounds which has been fused by heating at a high temperature is known as an electrolyte material for fuel cells, etc. However, molten salts obtained from mixtures of inorganic compounds have relatively high melting points, and even those which are said to be low-melting salts generally have melting points around 300° C. A subject for the utilization of such molten salts in batteries for practical use has been to drastically lower the melting points thereof.

Attempts were hence made to produce an electrolyte having a sufficient ionic conductivity even at room temperature. As a result, room-temperature molten salts obtained by adding an inorganic salt to a salt of an organic compound have been developed.

For example, an electrolyte comprising a mixture of an aluminum halide and either a 1,3-dialkylimidazole halide or a 1,2,3-trialkylimidazole halide is disclosed in JP-A-60-133669 (The term "JP-A" as used herein means an "unexamined published Japanese patent application"), JP-A-60-133670, JP-A-60-136180, JP-B-8-34770 (The term "JP-B" as used herein means an "examined Japanese patent publication"), and The Society of Polymer Science, Japan, *Polymer Preprints. Japan*, Vol. 46, No. 3 (1997).

At room temperature, the electrolyte comprising those compounds is in a molten state at room temperature and shows high ionic conductivity. However, this prior art electrolyte has drawbacks that the aluminum halide decomposes by the inclusion of even a slight amount of water, and that the phase state of the molten salt is unstable to temperature fluctuations.

SUMMARY OF THE INVENTION

An object of the present invention is to provide novel polyelectrolytes showing high ionic conductivity at room temperature and having excellent stability to temperature fluctuations.

Under these circumstances, the present inventors repeatedly conducted various experiments. As a result, they have found that the object of the present invention is accomplished by using as an electrolyte a molten salt polymer obtained by reacting an imidazolium derivative having a substituent at the 1- and 3-positions at least with an organic acid or an organic acid compound having an acid amide or acid imide bond, wherein at least one of said imidazolium derivative and said organic acid compound is a polymerizable monomer or a polymer. The present invention has been achieved based on this finding.

The molten salt polymer used as the electrolyte of the present invention has three major features.

The first feature resides in that since the molten salt polymer is amorphous and has a low glass transition temperature, it shows high segment mobility even at room temperature.

Polymeric compounds generally have crystallinity and a high glass transition temperature, and hence have reduced mobility. It has therefore been difficult to obtain a matrix suitable for ion conduction using such conventional polymers. In contrast, the molten salt polymer of the present invention can be easily doped with cations because of the use of a monomer salt of an imidazolium derivative in forming the molten salt. The molten salt polymer of the invention is hence expected to serve as a highly ionically conductive matrix having high flexibility.

The second feature resides in that the molten salt polymer can be extremely easily synthesized by bulk polymerization.

It is also possible to synthesize the molten salt polymer by producing beforehand an ionomer which is a polymer of an acid monomer and then adding a halide of imidazolium derivatives to the ionomer to treat the same. This method is advantageous in that since a polymer having a known molecular weight (degree of polymerization) can be used, a more homogeneous matrix can be synthesized.

In order for a polymeric compound to be used as an ionically conductive polymer matrix, the polymer should have a sufficiently wide potential window. In general, even a slight amount of inclusion considerably narrows the potential window. It is therefore essential to remove by-products. In synthesizing the molten salt polymer of the present invention, purification after synthesis is not especially required because the compound used as a polymerization initiator is electrically inactive.

The third feature resides in that the properties of the molten salt polymer are extremely stable to external factors such as water inclusion and temperature fluctuations.

The conventionally known molten salt comprising an aluminum halide, such as aluminum chloride, and an imidazolium salt has exceedingly poor chemical stability. In contrast, the molten salt polymer according to the present invention is extremely stable to external factors because an ionomer can be used in place of aluminum chloride or the like for producing the polymer. The mechanical and other material properties of the molten salt polymer can be regulated by changing the monomer ratio used for producing the same or by adding a third ingredient, according to need, in such a manner as not to impair the properties of the polymer. Consequently, the chemical properties of the molten salt polymer can be easily improved.

DETAILED DESCRIPTION OF THE INVENTION

Figure 1:
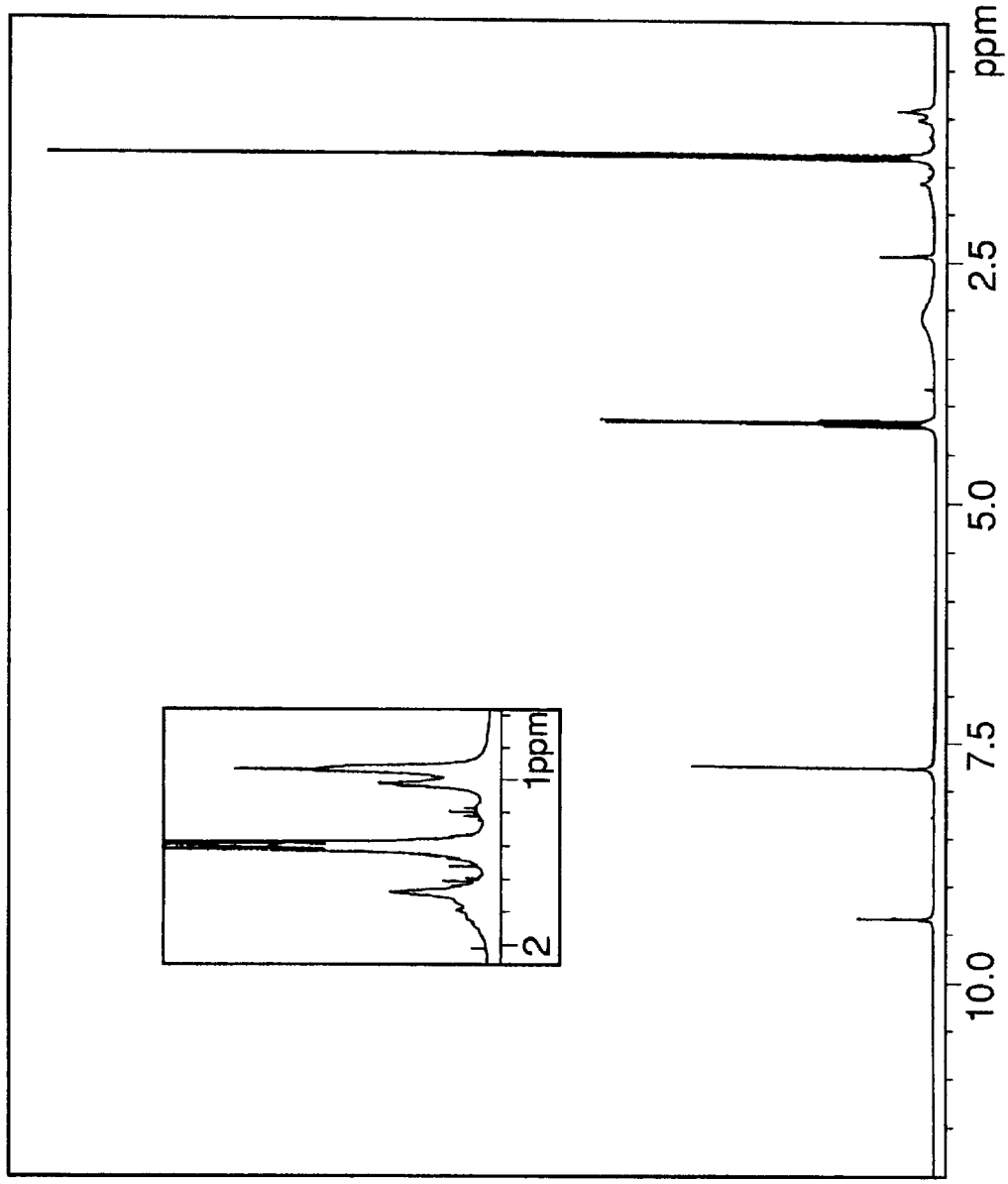
FIG. 1 is a diagrammatic view illustrating the results of $^1$H-NMR spectrometric analysis of the electrolyte obtained in Example 1.

The representative imidazolium derivatives used as starting materials for the molten salt polymers used in the present invention are compounds represented by the following formula.

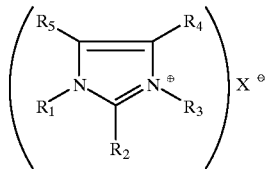

In the above formula, $R_1$ and $R_3$ each represents a hydrogen atom, a lower alkyl group, a vinyl group, a trifluoromethanesulfonamide-ethyl group or a sulfonylethyl group, with the proviso that at least one of $R_1$ and $R_3$ is a lower alkyl group, a vinyl group, a trifluoromethanesulfonamide-ethyl group or a sulfonylethyl group; $R_2$ represents a hydrogen atom or an alkyl group; $R_4$ and $R_5$ each represents a hydrogen atom, a lower alkyl group or a vinyl group; and X represents a halogen atom.

Typical examples of the imidazolium derivatives which are suitable for carrying out the present invention include a halide of imidazole compounds such as 1,3-dimethylimidazole, 1,2,3-trimethylimidazole, 1,3-dimethyl-2-ethylimidazole, 1-ethyl-3-methylimidazole, 1,2-dimethyl-3-ethylimidazole, 1,3-dimethyl-2-undecylimidazole, 1,3-diethylimidazole, 1,2-dimethyl-3-propylimidazole, 1,2,3-triethylimidazole, 1,3-diethyl-2-methylimidazole, 1,3-diethyl-2-undecylimidazole, 1-vinylimidazole, 1-vinyl-3-methylimidazole, 1-vinyl-3-ethylimidazole, 1-vinyl-2,3-dimethylimidazole, 4(5)-vinylimidazole, 1,3-dimethyl-4(5)-vinylimidazole, 1-vinyl-3-trifluoromethanesulfonamide-ethylimidazole, 1,3-di(trifluoromethanesulfonamide-ethyl)-4(5)-vinylimidazole and 1-ethyl-3-sulfonylethylimidazole.

Although the monomer used for constituting a vinyl polymer in carrying out the present invention can be a styrene derivative, especially preferred examples of the monomer are acrylic acid, methacrylic acid, and vinylsulfonic acid. The step for synthesizing a molten salt monomer by reacting an imidazolium derivative such as those enumerated above with a monomer may be accomplished by mixing these ingredients in water or in an organic solvent and removing the by-products such as a hydrogen halide and an inorganic salt together with the solvent.

The step for polymerizing the molten salt monomer to synthesize a molten salt polymer may be accomplished by adding to the molten salt monomer a small amount of a commercial radical polymerization initiator, e.g., potassium persulfate, benzoyl peroxide, azobisisobutyronitrile, cumene hydroperoxide, or tert-butyl hydroperoxide, evenly dispersing the initiator, and heating the dispersion. Besides the above polymerization technique, use may be made of a technique in which polymerization is initiated by ultraviolet irradiation, heating, etc.

In the step in which an imidazolium derivative is reacted with a monomer in carrying out the present invention, it is possible to use acrylic acid, methacrylic acid, vinylsulfonic acid, or the like in combination with an alkali metal salt of any of these acids. The molten salt polymer thus obtained can have markedly improved ionic conductivity.

The molten salt polymers that can be used in the present invention are obtained by various methods. For example, a molten salt polymer can be synthesized by polymerizing an acid monomer such as acrylic acid, methacrylic acid, or vinylsulfonic acid in an ordinary way to produce a polymer having a degree of polymerization of from 10 to 1,000 and then reacting the polymer with an imidazolium derivative selected from 1,3-dialkylimidazolium halides and 1,2,3-trialkylimidazolium halides. The molten salt polymer thus obtained also shows high ionic conductivity at room temperature.

In the case where an alkylimidazolium derivative having a vinyl group, such as a 1-vinyl-3-alkylimidazolium halide, a 1-vinyl-2,3-dialkylimidazolium halide or a 1,3-dialkyl-4(5)-vinylimidazolium halide, is used, a molten salt polymer can be yielded by reacting the imidazolium derivative with an acid such as a carboxylic acid, a sulfonic acid, or a sulfonic acid compound or with an acid monomer such as an acrylic acid, methacrylic acid, or vinylsulfonic acid to produce a molten salt monomer and then polymerizing the same. It is also possible to yield another molten salt polymer by polymerizing any of those monomeric imidazolium derivatives and reacting the resultant polymer with a polymer of an acid monomer such as acrylic acid, methacrylic acid, or vinylsulfonic acid.

Still another molten salt polymer can be obtained by reacting any of those 1-vinyl-3-alkylimidazolium halides, 1-vinyl-2,3-dialkylimidazolium halides or 1,3-dialkyl-4(5)-vinylimidazolium halides with a lithium bis (trifluoromethanesulfonimide) to produce a molten salt monomer and polymerizing the same.

A further molten salt polymer can be obtained by a method comprising reacting a poly(allylamine) with trifluoromethanesulfonyl chloride, converting the resultant poly(vinylsulfonamide) into an alkali metal salt as an ionomer, and reacting the ionomer with an imidazolium derivative.

Still a further molten salt polymer can be obtained by reacting an imidazolium compound having a vinyl group at the 1-position with a halogenated alkylsulfonamide to obtain a molten salt monomer having an imidazolium structure (cation) and a sulfonamide structure (anion) within the monomer unit and polymerizing the molten salt monomer. Still a further molten salt polymer can also be obtained by reacting 4(5)-vinylimidazole with a halogenated alkylsulfonamide to obtain a molten salt monomer which comprises a dialkylsulfonamide-vinylimidazolium salt and gives a single ionic conductor having in each monomer unit both a molten salt structure and a sulfonamide group having the ability to generate a carrier ion, and then polymerizing the molten salt monomer. Still a further molten salt polymer can also be obtained by reacting a 1-ethyl-3-sulfonylethylimidazolium halide with the aforementioned poly(allylamine).

Still a further molten salt polymer according to the present invention can also be produced by reacting an imidazolium derivative with a poly(sulfonamide) alkali metal salt obtained by reacting a disulfonyl chloride with a diamine.

The molten salt polymers thus produced show high ionic conductivity at room temperature and can be improved in their mechanical properties, like the molten salt polymers described hereinabove.

In carrying out the present invention, a halogen can be used as the counter anion of the imidazolium derivative. However, a sulfonimide salt, a sulfonamide salt, and the like are also preferred in which charges are more delocalized.

A molten salt monomer having an even lower melting point is obtained by reacting an imidazolium derivative with such a sulfonimide or sulfonamide salt to replace the counter anion of the imidazolium derivative.

The molten-salt type polyelectrolytes of the present invention can be utilized in the form of a structure produced by infiltrating an imidazolium salt derivative and a sulfonimide salt derivative, a lithium salt, or the like into a polymeric acid produced beforehand through polymerization or into a polyanionic resin obtained by incorporating negative charges into a solid porous polymer or a thin polymer film.

Examples of the aforementioned polymeric acid or polyanionic resin include NAFION [registered trademark of E.I. du Pont de Nemours & Co., Inc.; the same applies hereinafter] membranes having sulfonic acid residues, NAFION [registered trademark of E.I. du Pont de Nemours & Co., Inc.; the same applies hereinafter] membranes having carboxylic acid residues, polymer membranes obtained by incorporating negative charges into Teflon membranes through a post-treatment, various cation-exchange resins, poly(acrylic acid) resins obtained by polymerizing an acid monomer represented by acrylic acid with, a bifunctional monomer such as divinylbenzene, thin polymer films obtained by polymerizing an acid monomer represented by acrylic acid, forming the resultant polymer into a thin film (e.g., by casting), and then crosslinking the polymer by irradiation, etc., poly(acrylic acid) resins in a film or another form obtained by polymerizing an acid monomer represented by acrylic acid and reacting the resultant polymer with a diamine to crosslink the polymer through amide bonds, and poly(acrylic acid) resins in a thin film or another form obtained by copolymerizing an acid monomer represented by acrylic acid with a monomer having any of various reactive groups such as hydroxyl, amino, thiol, and chloromethyl groups and then adding an appropriate polyfunctional polymer reactive with the comonomer to crosslink the copolymer.

The thin polymer films desirably have physical and chemical properties which enable the films to be utilizable as general-purpose films. However, thin polymer films not having such a high mechanical strength may be used as long as the chemical resistance and potential window thereof satisfy requirements concerning electrode reactions. Conversely, polymer films which are nonporous or have no interconnected through pores are unsuitable for use. Consequently, a knit fabric made of thin fibers or the like is also usable.

The films desirably have dissociating groups, desirably groups having the ability to form a molten salt. Examples of these groups include carboxy, sulfo, and sulfonimide groups. Such groups serve to stably hold the molten salt with which the films are impregnated.

The polyelectrolytes obtained according to the present invention can be used in a wide range of forms, from one formable into a thin film to particles. An appropriate form can be selected according to applications.

The properties thereof vary depending on the conditions under which the molten salts are applied as a film or resin.

The most important requirements for a flexible polyelectrolyte film which can be formed into a thin film are homogeneity in property and large film size, which are highly effective in mitigating the inhomogeneity of conventional gel electrolytes.

Examples of such a thin film include NAFION membranes having sulfonic acid residues, NAFION membranes having carboxylic acid residues, and polymer films obtained by incorporating negative charges into porous Teflon membranes through a post-treatment. These thin films may be impregnated with an imidazolium salt derivative and a sulfonimide salt derivative or a lithium salt.

On the other hand, particles are advantageous in that handling thereof is easy because the surface of the particles can be regulated so as to have an appropriate particle diameter and because interconnected domains of a molten salt can be formed therein. In addition, the particles can be utilized a s electrically conductive fillers suitable for various shapes. These particles may be obtained by impregnating a cation-exchange resin with an imidazolium salt derivative and a sulfonimide salt derivative or a lithium salt.

The aforementioned poly(acrylic acid) resins obtained by polymerizing an acid monomer represented by acrylic acid or thin polymeric films of the resins can be used in applications according to desires, since they can be designed to have various material properties, from those suitable for flexible films to those suitable for particles, by controlling the degree of crosslinking.

The present invention will be explained below in more detail by reference to Examples, but the invention should not be construed as being limited thereto.

EXAMPLE 1

To 20 ml of acetonitrile were added 7.25 g of 1,3-diethylimidazolium bromide obtained by reacting 1-ethylimidazole with bromoethane and 3.05 g of methacrylic acid. The mixture was stirred at room temperature for dissolution. After the system was ascertained to have become homogeneous, the solvent and the hydrogen bromide generated were evaporated at room temperature under a reduced pressure over a period of 2 hours. To the reaction product was added 20 ml of acetone. Vacuum distillation was conducted again to remove the solvent and to remove hydrogen bromide from the molten salt monomer obtained.

To the molten salt monomer was added 0.029 g (5 mol % based on the vinyl monomer units) of azobisisobutyronitrile as a radical polymerization initiator. Thereto was added 5 ml of ethanol, and the mixture was heated at 70° C. for 30 minutes to polymerize the monomer, and the solvent was then evaporated under a reduced pressure to produce a molten salt polymer represented by the following formula:

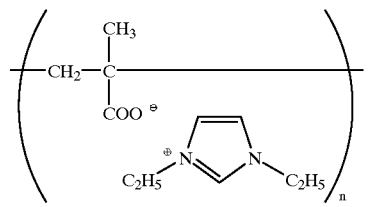

wherein n is 2 to 100.

The molten salt polymer had a viscosity increased through the polymerization. It was a colorless transparent rubber-like compound having no flowability. From the mechanical properties thereof, the polymer was ascertained to be formable into an excellent film. The structure of the molten salt polymer obtained was examined by $^1$H-NMR spectrometry, and the results obtained are given in FIG. 1. The NMR spectrum shows that 1,3-diethylimidazolium and methacrylic acid were present in the same amount in the system, and that the peak assignable to the imidazolium had shifted and there was no peak assignable to the —OH group of the carboxylic acid. It was ascertained from these results that the 1,3-diethylimidazolium and the methacrylic acid were present in the form of a salt.

The mobility of the molten salt polymer was analyzed based on a measurement of ionic conductivity by the complex impedance method and on thermal analysis with a differential scanning calorimeter.

Figure 2:
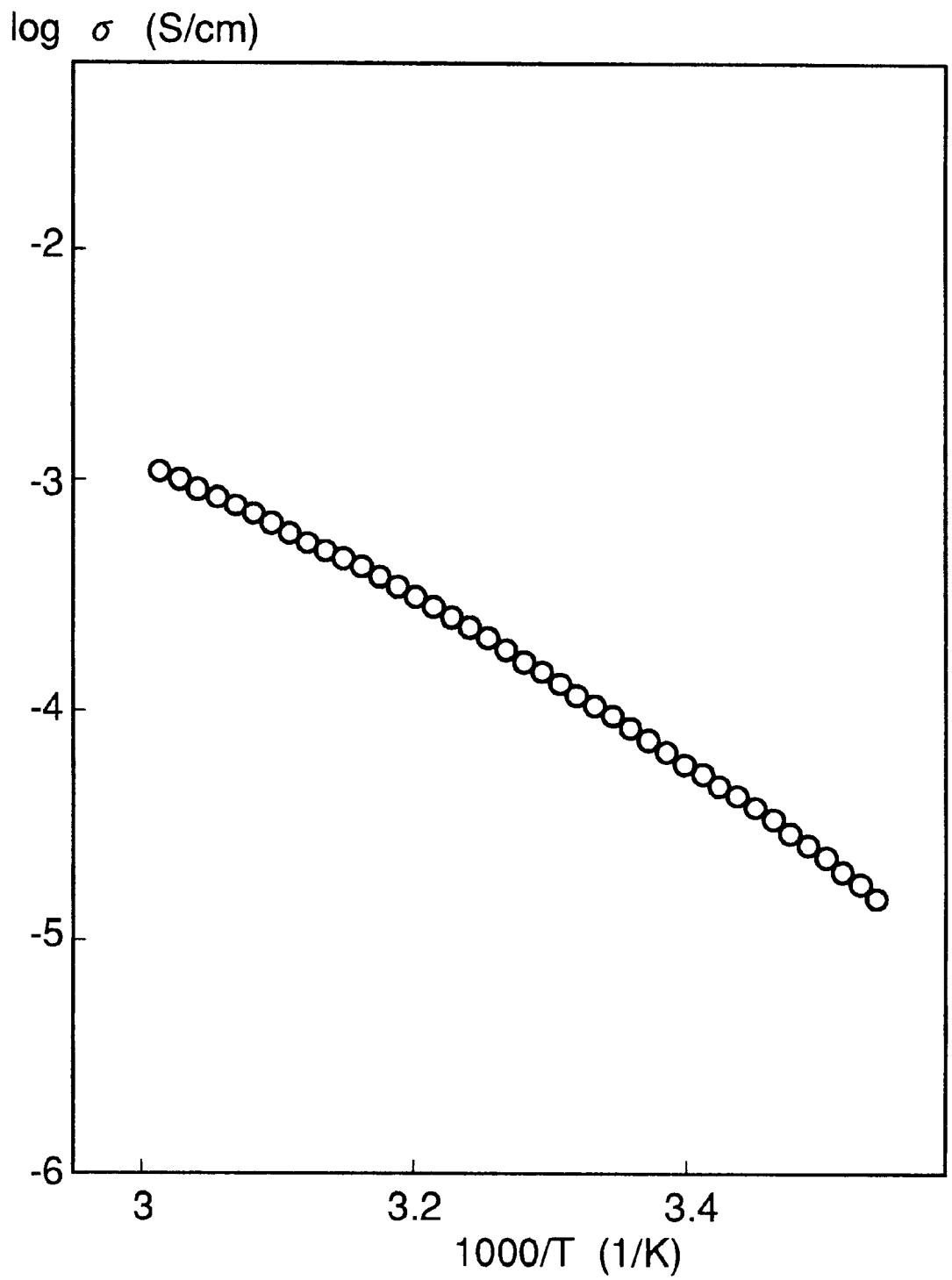
FIG. 2 is a diagrammatic view illustrating the temperature dependence of ionic conductivity of the electrolyte obtained in Example 1.

The temperature dependence of ionic conductivity of this polymer in a minute region is shown in FIG. 2. The polymer had ionic conductivities as high as $1.50 \times 10^{-4}$ S/cm at 30° C. and $6.56 \times 10^{-4}$ S/cm at 50° C.

Figure 3:
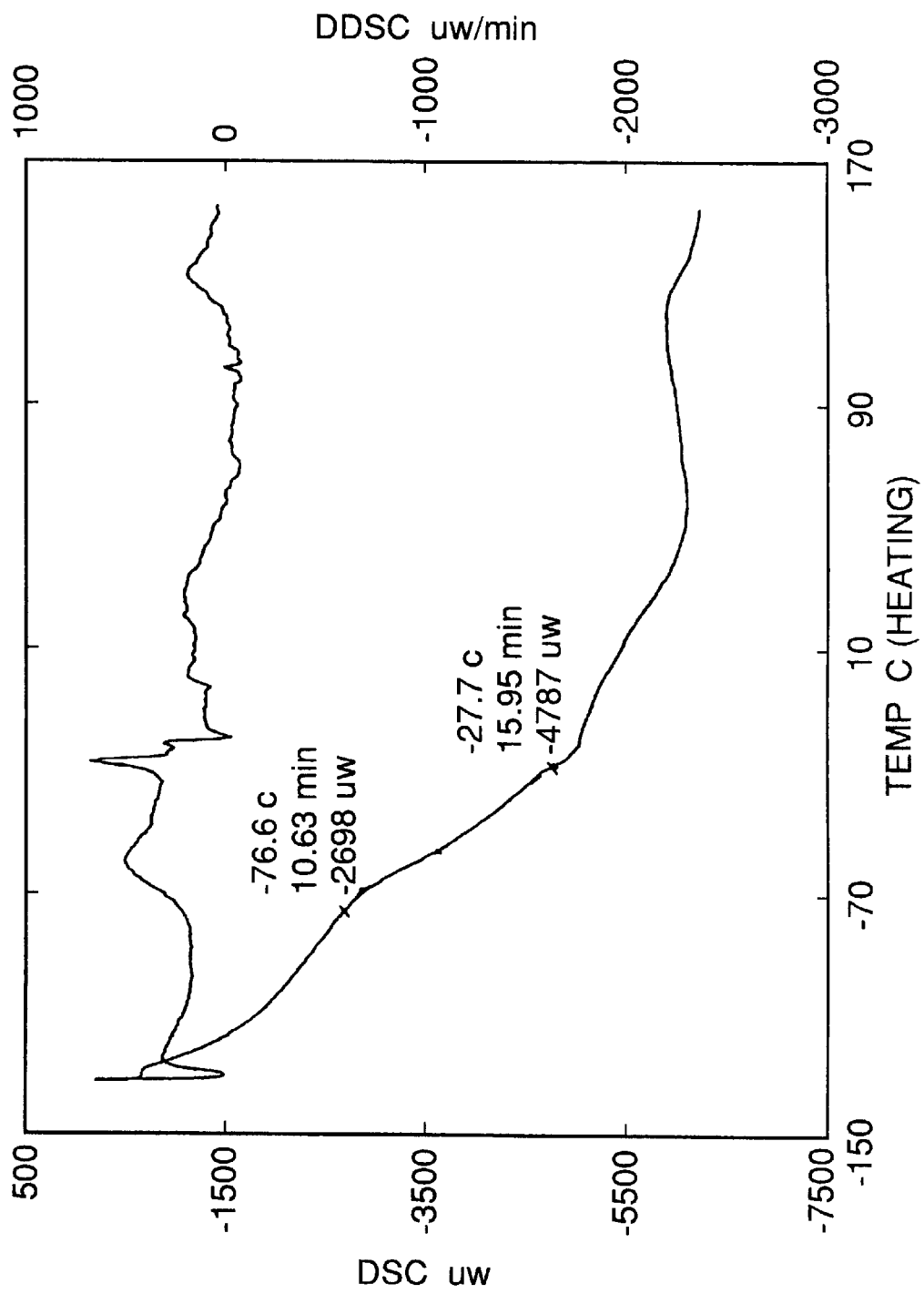
FIG. 3 is a diagrammatic view illustrating the results of differential scanning calorimetric examination of the electrolyte obtained in Example 1.

The results of the analysis with a differential scanning calorimeter are shown in FIG. 3. It was found that despite its high molecular weight, the polymer had an exceedingly low glass transition temperature of −76.6° C. and showed high mobility at around room temperature. Furthermore, no distinct endothermic or exothermic peak was observed except at the glass transition point. It was thus ascertained that the molten salt polymer was amorphous in a wide temperature range and, hence, it was free from the property changes caused by crystallization and had excellent stability to temperature fluctuations.

EXAMPLE 2

A molten salt polymer was produced in the same manner as in Example 1, except that 1,2-dimethyl-3-ethylimidazolium bromide obtained by reacting 1,2-dimethylimidazole, in place of 1-ethylimidazole, with bromoethane was reacted with methacrylic acid to obtain a molten salt monomer, which was polymerized with heating in the presence of azobisisobutyronitrile as a radical polymerization initiator. The molten salt polymer thus obtained, which was represented by the following formula, was a white crystalline substance at room temperature and a non-flowable white rubber-like compound at 50° C.:

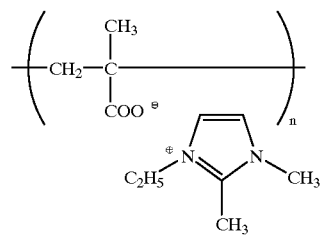

wherein n is 2 to 100.

The mobility of the molten salt polymer was analyzed based on a measurement of ionic conductivity by the complex impedance method and on thermal analysis with a differential scanning calorimeter.

The polymer had ionic conductivities as high as $6.8 \times 10^{-5}$ S/cm at 30° C. and $3.6 \times 10^{-4}$ S/cm at 50° C. The results of the analysis with a differential scanning calorimeter revealed the following. The polymer had a glass transition temperature of −70.4° C. and showed at around room temperature a fusion peak attributable to a salt structure. It was found that because of the low glass transition temperature, the molten salt polymer showed exceedingly high mobility at temperatures not lower than the melting point.

EXAMPLE 3

The reaction of 1,3-diethylimidazolium bromide was conducted in the same manner as in Example 1, except that a mixture of methacrylic acid and 2–10 mol % alkali metal salt of the methacrylic acid was used in place of methacrylic acid alone. The subsequent treatments were conducted in the same manner as in Example 1 to synthesize a molten salt polymer.

The alkali metal salt of methacrylic acid used for carrying out the test was each of the lithium, sodium, potassium, rubidium, and cesium salts of methacrylic acid.

The thus-obtained molten salt polymers containing alkali metal ions each had a viscosity increased through the polymerization. It was ascertained that the addition of alkali metal ions did not inhibit the polymerization reaction.

Among the thus-obtained molten salt polymers containing alkali metal ions, the system containing potassium ions was a milk-white rubber-like compound having no flowability. The systems containing the other alkali metal salts each was a light-red transparent rubber-like compound.

From these test results, it was found that the incorporation of alkali metal salts of methacrylic acid resulted in molten salt polymers which had higher hardness and better film-forming properties than the molten salt homopolymer obtained in Example 1.

Figure 4:
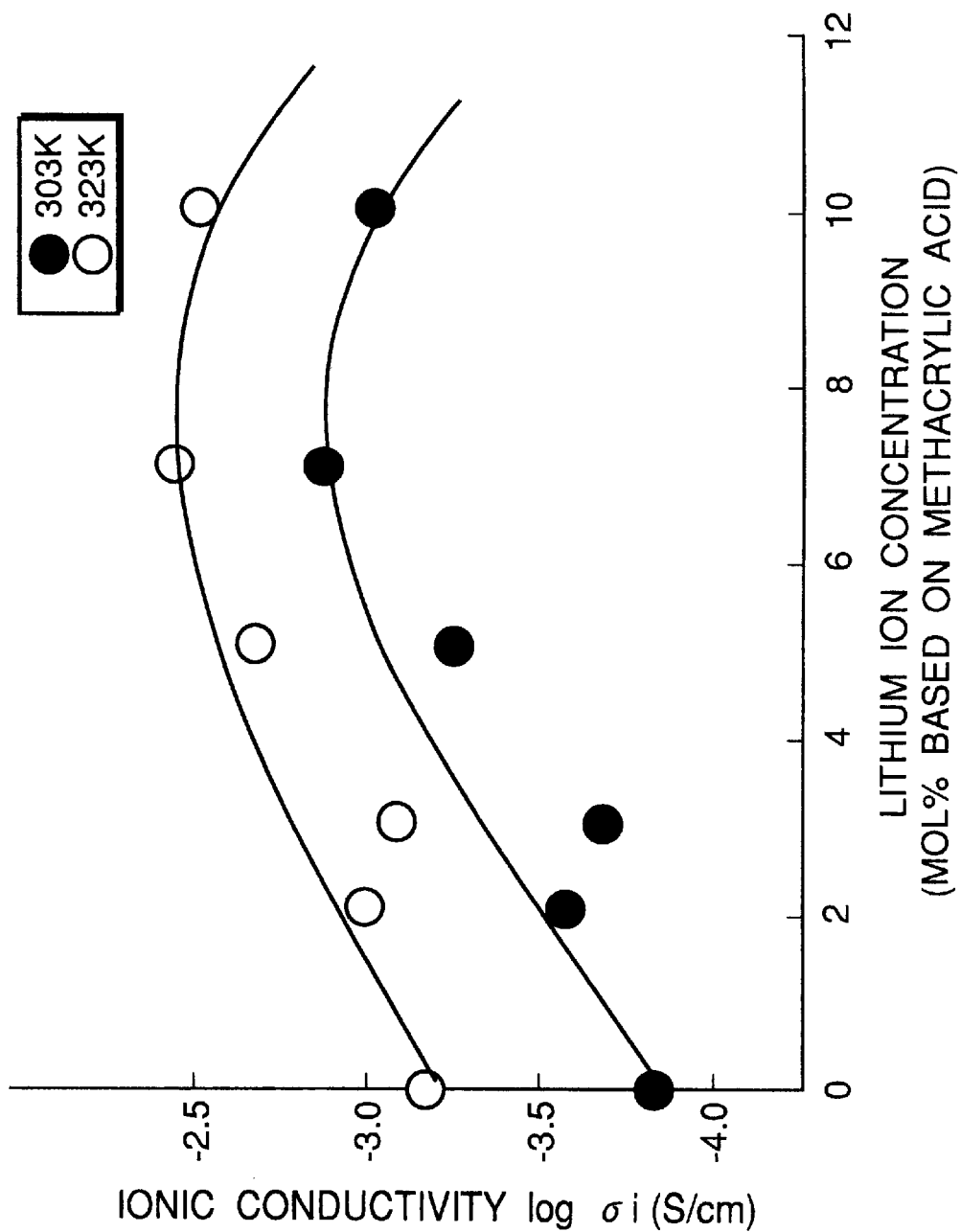
FIG. 4 is a diagrammatic view illustrating the lithium ion concentration dependence of ionic conductivity of an electrolyte obtained in Example 3.

The molten salt polymers containing alkali metal ions were subjected to a measurement of ionic conductivity and thermal analysis with a differential scanning calorimeter. In FIG. 4 is shown the correlation between lithium ion concentration and ionic conductivity in the system containing lithium as alkali metal ions.

These molten salt polymers had ionic conductivities as high as from 2 to 10 times that of the molten salt polymer containing no alkali metal ions. In the analysis with a differential scanning calorimeter in the range of from −130° C. to +200° C., the molten salt polymers showed low glass transition temperatures ranging from −60 to −30° C. Furthermore, no distinct peak was observed for each polymer except at the glass transition point. It was thus ascertained that the molten salt polymers were amorphous in a wide temperature range and had excellent stability to temperature fluctuations.

EXAMPLE 4

In 50 ml of water was dissolved 2.92 g of a poly (methacrylic acid) [average polymerization degree, 130] synthesized beforehand by the radical polymerization of methacrylic acid. Thereto was added 6.97 g of 1,3-diethylimidazolium bromide synthesized in the same manner as in Example 1. Vacuum distillation was conducted at a temperature of 80° C. for 2 hours. Thereafter, 50 ml of water was added, and vacuum distillation was conducted to remove hydrogen bromide.

The molten salt polymer thus obtained was a rubber-like compound more flexible than the poly(methacrylic acid) used, and was similar to the compound obtained in Example 1.

The mobility of the molten salt polymer was analyzed based on a measurement of ionic conductivity by the complex impedance method and on thermal analysis with a differential scanning calorimeter.

This polymer had ionic conductivities of $1.20 \times 10^{-4}$ S/cm at 30° C. and $8.10 \times 10^{-4}$ S/cm at 50° C., showing that the temperature dependence of ionic conductivity of the polymer in a minute region was almost equal to that of the molten salt polymer obtained in Example 1. It was thus found that the molten salt polymer synthesized from a polymer of an acid monomer also had satisfactory ionic conductivity.

From the results of the measurement with a differential scanning calorimeter, the molten salt polymer was found to have an exceedingly low glass transition temperature of −69.0° C. and show high mobility at around room temperature. Those results of ionic conductivity measurement were almost the same as those obtained in Example 1, showing that the molten salt compound obtained above was almost similar to that obtained in Example 1.

EXAMPLE 5

To 22 g of a 10% aqueous poly(allylamine) solution was added trifluoromethanesulfonyl chloride. An aqueous solution containing 1.50 g of sodium hydroxide was gradually added dropwise thereto with stirring. This mixture was reacted at room temperature with stirring for a whole day and night. After the resultant reaction mixture was ascertained to have a pH of 1.0, the white precipitate which had separated out in the mixture was recovered by centrifuging. In 50 ml of an aqueous solution containing 30% methanol was dissolved 0.5 g of the thus-obtained poly (allyltrifluoromethanesulfonamide). This solution was reacted with lithium hydroxide in an amount of 63 mg, which was the equimolar amount based on the sulfonamide groups. The solvent was then removed by vacuum distillation to obtain a poly(allyltrifluoromethanesulfonamide) lithium salt represented by the following formula:

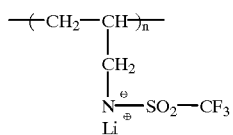

wherein n is 2 to 100.

On the other hand, 1-ethyl-3-methylimidazolium bromide, 1,2-dimethylimidazolium bromide, 1,2-dimethyl-3-ethylimidazolium bromide, and 1,2-dimethyl-3-propylimidazolium bromide were separately reacted with an equimolar amount of lithium bis (trifluoromethanesulfonylimide) [abbreviated as LiTFSI] in the presence of an acetonitrile solvent to yield 1-ethyl-3-methylimidazolium trifluoromethanesulfonimide, 1,2-dimethylimidazolium trifluoromethanesulfonimide, 1,2-dimethyl-3-ethylimidazolium trifluoromethanesulfonimide, and 1,2-dimethyl-3-propylimidazolium trifluoromethanesulfonimide, respectively. These reaction products each was dissolved in 30% aqueous ethanol solution at 80° C. in an amount equivalent to the sulfonamide groups of the poly(allyltrifluoromethanesulfonamide) lithium salt. The resultant solutions were distilled under vacuum at a temperature of 45° C. for 24 hours to evaporate the solvent. Thus, molten salt polymers containing a lithium salt which were represented by the following formula were obtained respectively.

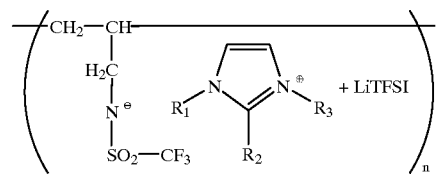

In the formula, LiTFSI represents lithium bis (trifluoromethanesulfonylimide); $R_1$ represents a hydrogen atom, a methyl group, or an ethyl group; $R_2$ represents a hydrogen atom or a methyl group; $R_3$ represents a methyl group, an ethyl group, or a propyl group; and n is 2 to 100.

Figure 5:
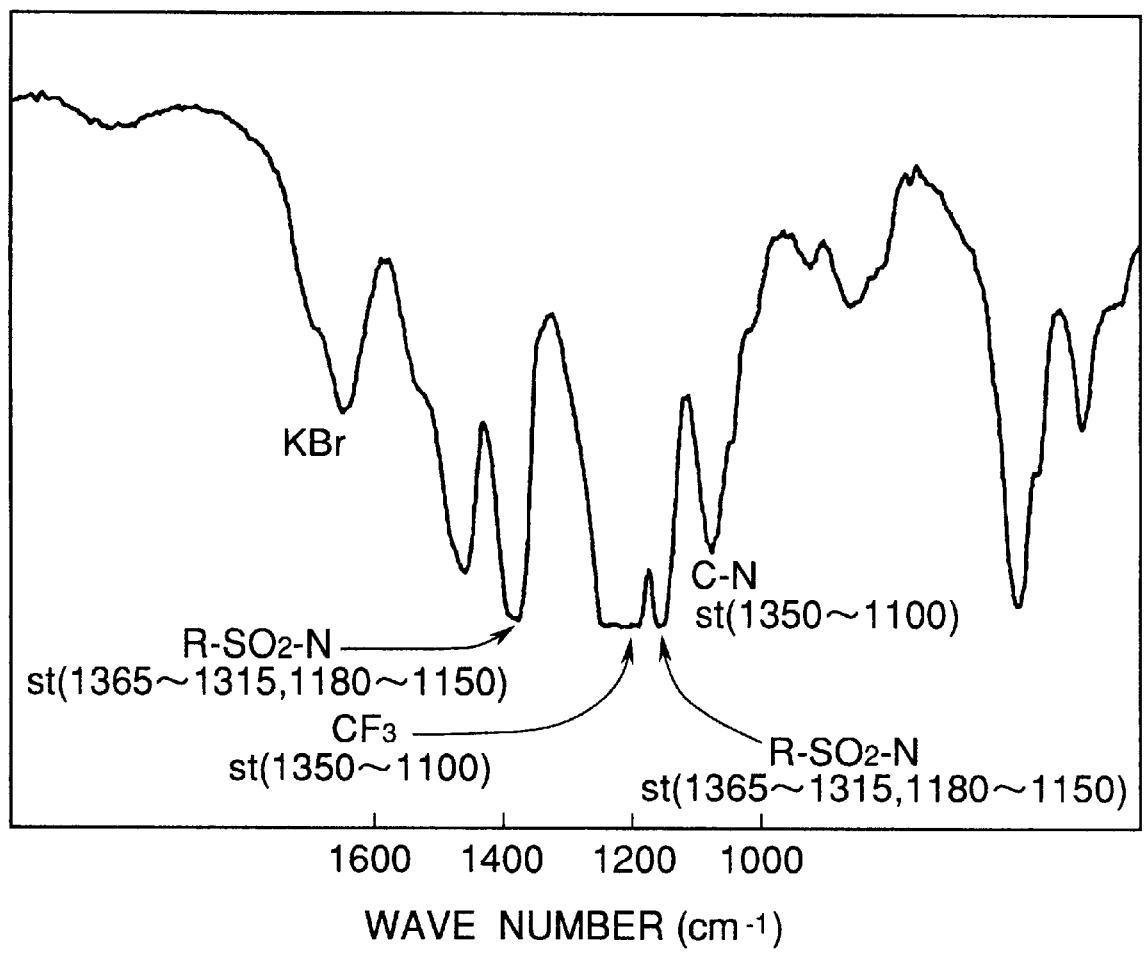
FIG. 5 is a diagrammatic view illustrating an infrared absorption spectrum of the poly (allyltrifluoromethanesulfonamide) obtained in Example 5.

The molten salt polymers containing a lithium salt each was a brown glassy solid. The progress of the reaction of poly(allylamine) for yielding the poly (allyltrifluoromethanesulfonamide) was ascertained from the IR spectrum shown in FIG. 5 by ascertaining the presence of $CF_3$ stretching vibration therein. The incorporation of lithium ions was ascertained by absorptiometry.

The ionic conductivities (at 30° C.) and glass transition temperatures of the molten salt polymers containing a lithium salt were measured, and the results obtained are shown in Table 1 below. It was found that these compounds had exceedingly high mobility at room temperature and hence were capable of functioning as excellent ionic conductors having high ionic conductivities.

TABLE 1

| Starting imidazolium derivative | Ionic conductivity (S/cm) | Glass transition temperature (° C.) |
| --- | --- | --- |
| 1-Ethyl-3-methyl derivative | $1.50 \times 10^{-4}$ | −89.0 |
| 1,2-Dimethyl derivative | $2.20 \times 10^{-4}$ | −86.5 |
| 1,2-Dimethyl-3-ethyl derivative | $1.08 \times 10^{-4}$ | −69.0 |
| 1,2-Dimethyl-3-propyl derivative | $1.15 \times 10^{-5}$ | −75.9 |

EXAMPLE 6

To 20 ml of acetonitrile were added 1.88 g of 1-vinyl-3-ethylimidazolium bromide obtained by reacting 1-vinylimidazole with bromoethane and 1.48 g of propionic acid. The mixture was stirred at room temperature for dissolution. After the system was ascertained to have become homogeneous, the solvent and the hydrogen bromide generated were evaporated at room temperature under a reduced pressure over a period of 20 hours. To the reaction product was added 20 ml of acetone. Vacuum distillation was conducted again to remove the solvent and to remove hydrogen bromide from the molten salt monomer obtained.

To the molten salt monomer was added 0.164 g (5 mol % based on the vinyl monomer units) of azobisisobutyronitrile as a radical polymerization initiator. Thereto was added 5 ml of ethanol and the mixture was heated at 70° C. for 30 minutes to polymerize the monomer to yield a molten salt polymer. The solvent was then evaporated under a reduced pressure. The molten salt polymer thus obtained, which was represented by the following formula, was a colorless transparent rubber-like compound having no flowability:

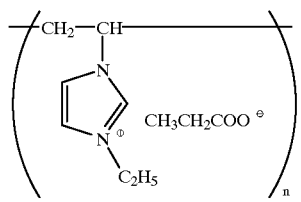

wherein n is 2 to 100.

The mobility of the molten salt polymer was analyzed based on a measurement of ionic conductivity by the complex impedance method and on thermal analysis with a differential scanning calorimeter.

This polymer had ionic conductivities of $3.2 \times 10^{-5}$ S/cm at 30° C. and $8.8 \times 10^{-5}$ S/cm at 50° C., showing that use of the poly(vinylimidazolium) was also effective in retaining relatively high mobility.

The results of the measurement with a differential scanning calorimeter showed the following. The polymer had a glass transition temperature of −62° C., and no distinct endothermic or exothermic peak was observed except at the glass transition point. It was thus ascertained that the molten salt polymer was amorphous in a wide temperature range and, hence, it was free from the property changes caused by crystallization and had excellent stability to temperature fluctuations.

EXAMPLE 7

In 50 ml of water was dissolved 1.72 g of a poly (methacrylic acid) having a relatively low molecular weight [average polymerization degree, 50]. Thereto was added 4.06 g of a poly(vinyl-3-ethylimidazolium bromide) [average polymerization degree, 110] synthesized in the same manner as in Example 1 by polymerizing 1-vinyl-3-ethylimidazolium bromide. This mixture was stirred at room temperature for dissolution. After the system was ascertained to have become homogeneous, the solvent and the hydrogen bromide generated were evaporated at room temperature under a reduced pressure over a period of 20 hours.

To the reaction product was added 20 ml of ethanol. Vacuum distillation was conducted again to completely remove hydrogen bromide. The molten salt polymer thus obtained, which was represented by the following formula, was a milk-white rubber-like compound having no flowability:

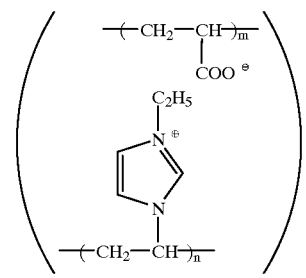

wherein m is 2 to 100 and n is 2 to 200.

This polymer was subjected to a measurement of ionic conductivity and an examination with a differential scanning calorimeter. The results obtained were almost the same as those obtained in the foregoing Examples. No distinct endothermic or exothermic peak was observed except at the glass transition point. It was thus ascertained that the molten salt polymer was amorphous in a wide temperature range and, hence, it was free from the property changes caused by crystallization and had excellent stability to temperature fluctuations.

EXAMPLE 8

In 50 ml of acetonitrile was dissolved 5.0 g of 1-ethyl-3-vinylimidazolium bromide obtained by reacting 1-vinylimidazole with bromoethane. Thereto was added an equimolar amount of lithium bis (trifluoromethanesulfonylimide) (LiTFSI). This mixture was stirred at room temperature for dissolution. After the system was ascertained to have become homogeneous, the solvent was evaporated at room temperature under a reduced pressure over a period of 2 hours. To the reaction product was added 50 ml of dichloromethane. The lithium bromide generated as a precipitate was separated from the solution by centrifuging, and the supernatant was recovered. To this supernatant solution was added 20 ml of distilled water. The resultant mixture was vigorously agitated and then allowed to stand for a while. The dichloromethane layer as an organic layer was recovered, and vacuum distillation was conducted again to remove the solvent. Thus, a molten salt monomer was observed which comprised the vinylimidazolium derivative and an imide anion coordinated thereto.

Figure 6:
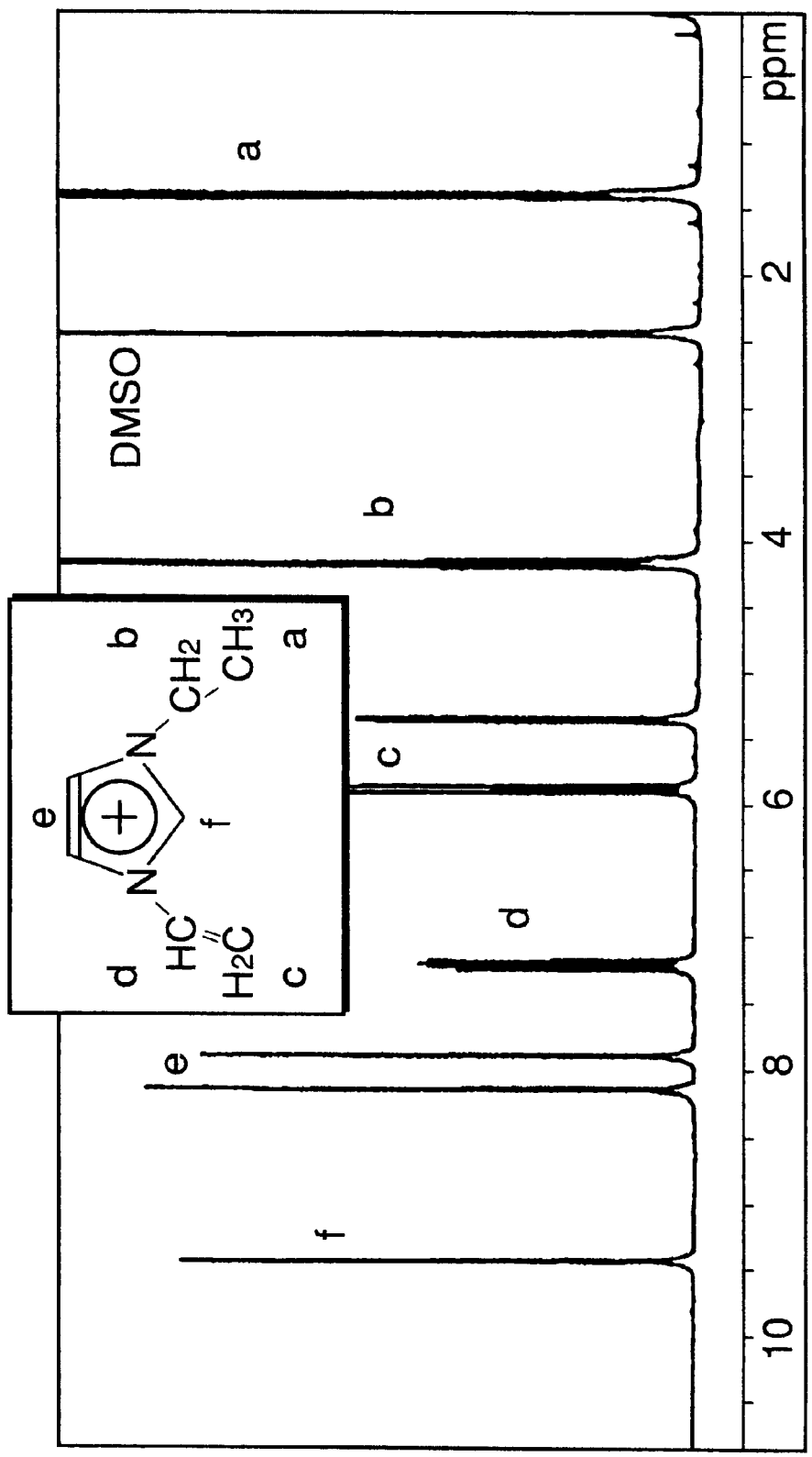
FIG. 6 is a diagrammatic view illustrating the results of $^1$H-NMR spectrometric analysis of the 1-ethyl-3-vinylimidazolium chloride obtained in Example 8.
Figure 7:
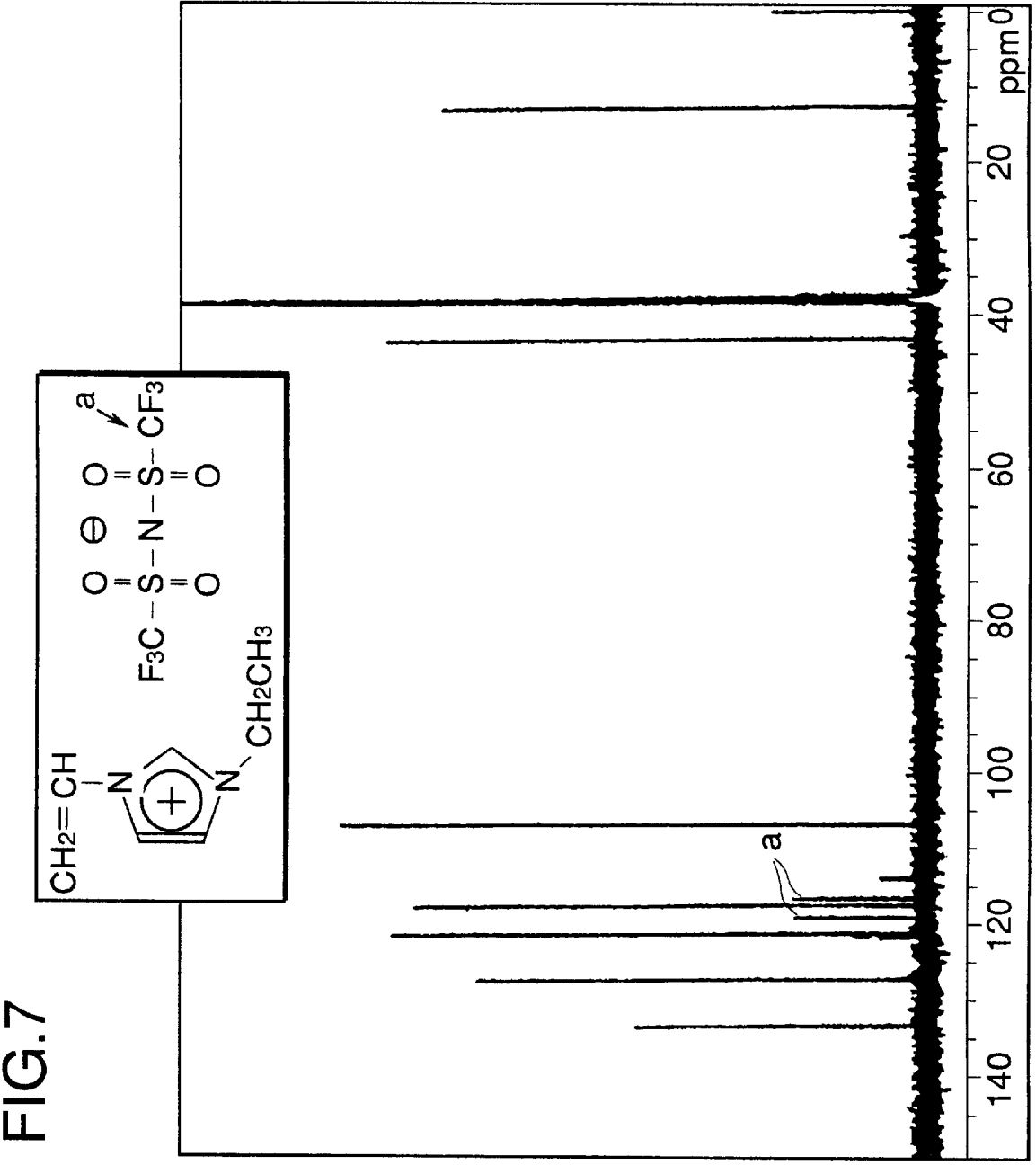
FIG. 7 is a diagrammatic view illustrating the results of $^{13}$C-NMR spectrometric analysis of the 1-ethyl-3-vinylimidazolium trifluoromethanesulfonimide obtained in Example 8.

That the molten salt monomer had a TFSI anion and still retained the vinyl group after the reaction was ascertained from the results of $^1$H-NMR spectrometric analysis of the 1-ethyl-3-vinylimidazolium chloride which are given in FIG. 6 and from the results of $^{13}$C-NMR spectrometric analysis of the 1-ethyl-3-vinylimidazolium trifluoromethanesulfonimide which are given in FIG. 7.

To 1.5 g of the molten salt monomer was added LiTFSI in each of various amounts ranging from 1/100 to 5 times by mole the amount of the monomer. To each of the mixtures was added 5.74 mg (5 mol % based on the vinyl monomer units) of azobisisobutyronitrile as a radical polymerization initiator, followed by 20 ml of ethanol to obtain homogeneous dispersions. The dispersions were heated at 65° C. for about 3 hours to polymerize the monomer. Thus, molten salt polymers containing a lithium salt dissolved therein were yielded which were represented by the following formula:

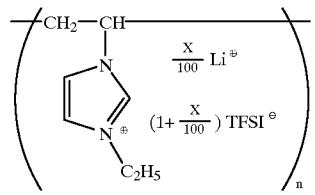

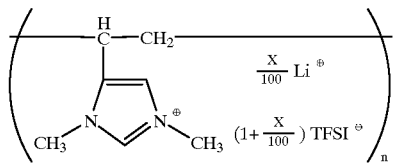

wherein TFSI represents a trifluoromethanesulfonimide group, x is 0 to 500, and n is 2 to 100.

Figure 8:
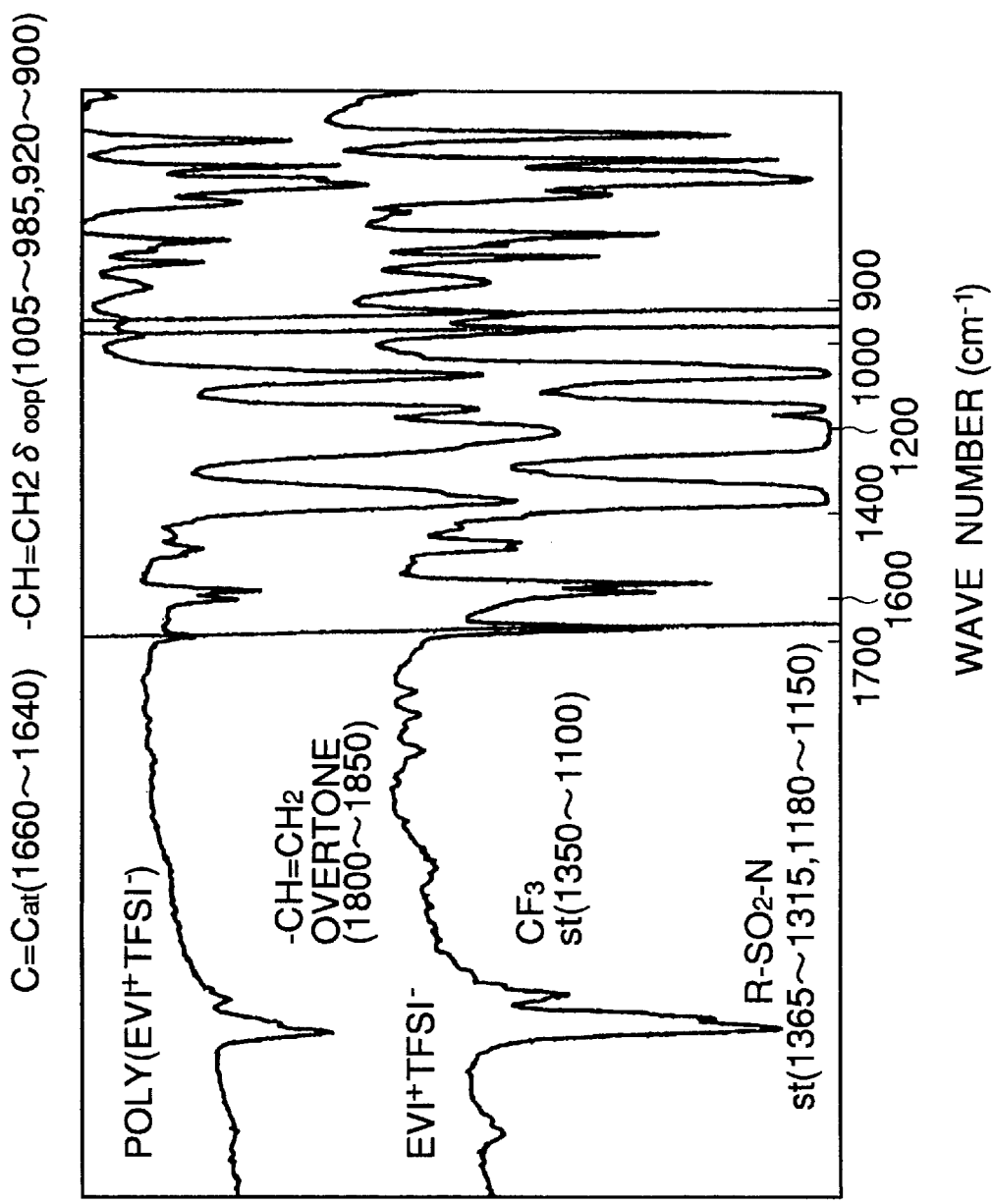
FIG. 8 is a diagrammatic view illustrating infrared absorption spectra of the 1-ethyl-3-vinylimidazolium trifluoromethanesulfonimide before polymerization (EVI⁺TFSI⁻) and after polymerization [Poly(EVI⁺TFSI⁻)] in Example 8.

Thereafter, the solvent was removed by vacuum drying. The molten salt polymers thus obtained each had a viscosity increased through the polymerization, and was a white glassy compound having no flowability. The structures of the molten salt polymers obtained were ascertained from the IR spectra of the 1-ethyl-3-vinylimidazolium trifluoromethanesulfonimide before polymerization (EVI$^+$TFSI$^-$) and after polymerization [Poly(EVI$^+$TFSI$^-$)] shown in FIG. 8. The peak assignable to the vinyl group had disappeared through the polymerization and, except this, the spectra had almost the same form. It was ascertained from these results that the polymerization reaction had proceeded without fail and that the structures of the compounds had not changed during the polymerization.

Figure 9:
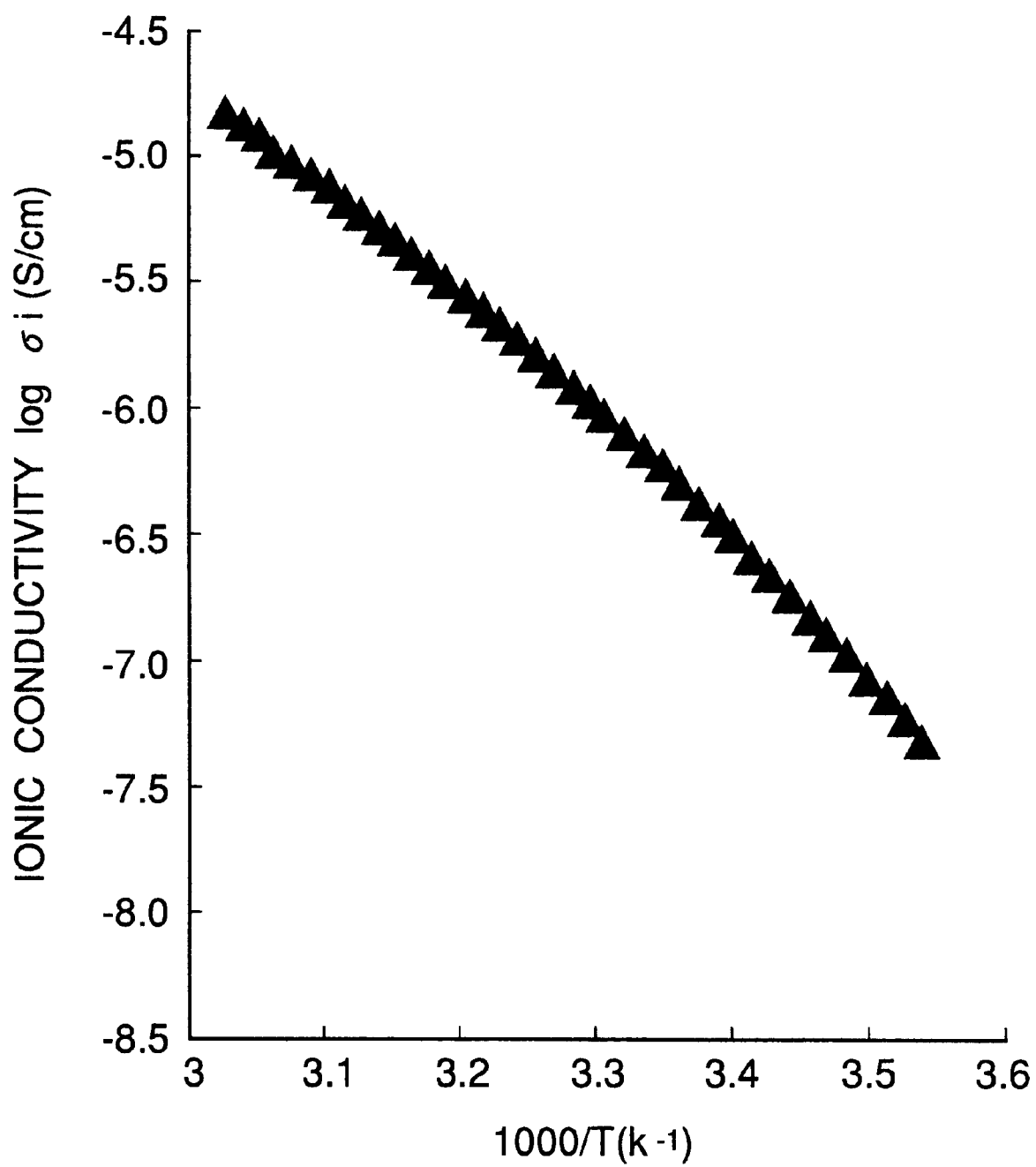
FIG. 9 is a diagrammatic view illustrating the temperature dependence of ionic conductivity of the electrolytes obtained in Example 8.

The molten salt polymers were analyzed based on a measurement of ionic conductivity by the complex impedance method and on thermal analysis with a differential scanning calorimeter. As a result, the temperature dependence of ionic conductivity thereof in a minute region is as shown in FIG. 9. The polymers had an ionic conductivity of $1.0 \times 10^{-4}$ S/cm at 30° C. and a glass transition temperature of $-73.4°$ C., had exceedingly high mobility at room temperature, and were amorphous in a wide temperature range of from $-150°$ C. to 200° C. These properties and the extremely low glass transition temperature of the polymers indicate that the formation of a molten salt in polymer side chains was effective in imparting high mobility.

EXAMPLE 9

Five grams of urocanic acid was decarboxylated with vacuum distillation at a temperature of 230° C. to obtain 4(5)-vinylimidazole. In 100 ml of methanol was dissolved 2 g of the 4(5)-vinylimidazole. Thereto was added 80 g of bromomethane and 0.85 g of sodium hydroxide. This mixture was reacted in an autoclave at 40° C. for 7 days. The resultant reaction mixture was distilled under vacuum at 50° C. to remove the solvent and the excess bromomethane. To the residue was added 50 ml of chloroform. The white precipitate (NaBr) generated was removed by filtration, and the supernatant solution was recovered and vacuum-dried at room temperature. Thus, 1,3-dimethyl-4(5)-vinylimidazolium chloride was synthesized.

Figure 10:
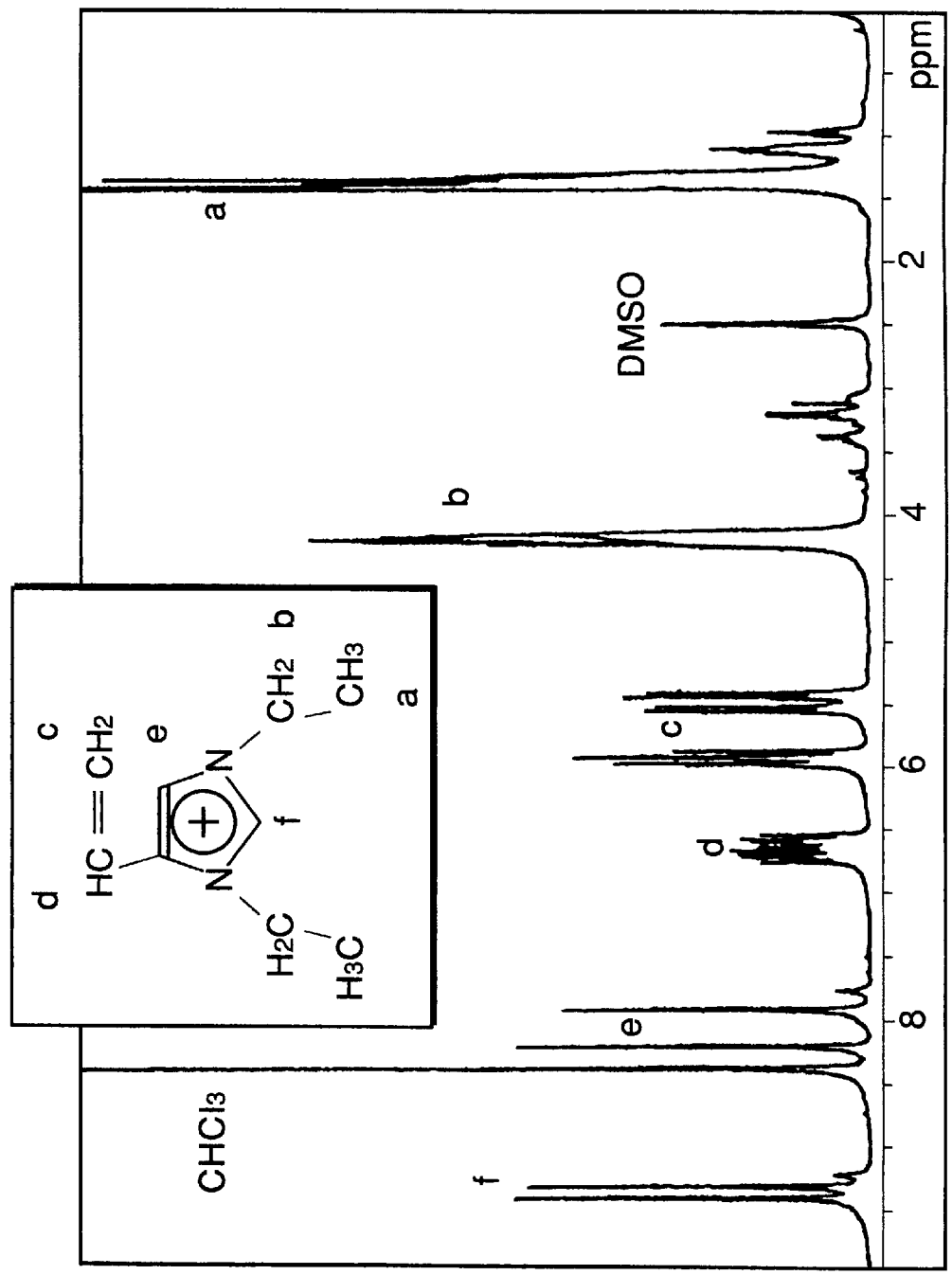
FIG. 10 is a diagrammatic view illustrating the results of ¹H-NMR spectrometric analysis of the 1,3-diethyl-4(5)-imidazolium chloride obtained in Example 9.

A $^1$H-NMR spectrum of this compound is shown in FIG. 10. It was ascertained that the structure of the vinyl group had been maintained through the reactions for yielding the compound, and that two halogenated alkyl groups had been bonded to the nitrogen atoms.

The 1,3-dimethyl-4(5)-vinylimidazolium chloride obtained was treated in the same manner as in Example 8 to replace the halide ion with a TFSI anion. The molten salt monomer thus obtained was subjected to a radical polymerization reaction using azobisisobutyronitrile in the same manner as in Example 8 to obtain a molten salt polymer represented by the following formula. The polymer thus obtained was a yellowish white resinous compound.

In the above formula, TFSI represents a trifluoromethanesulfonimide group, X is 0 to 500, and n is 2 to 100.

Figure 11:
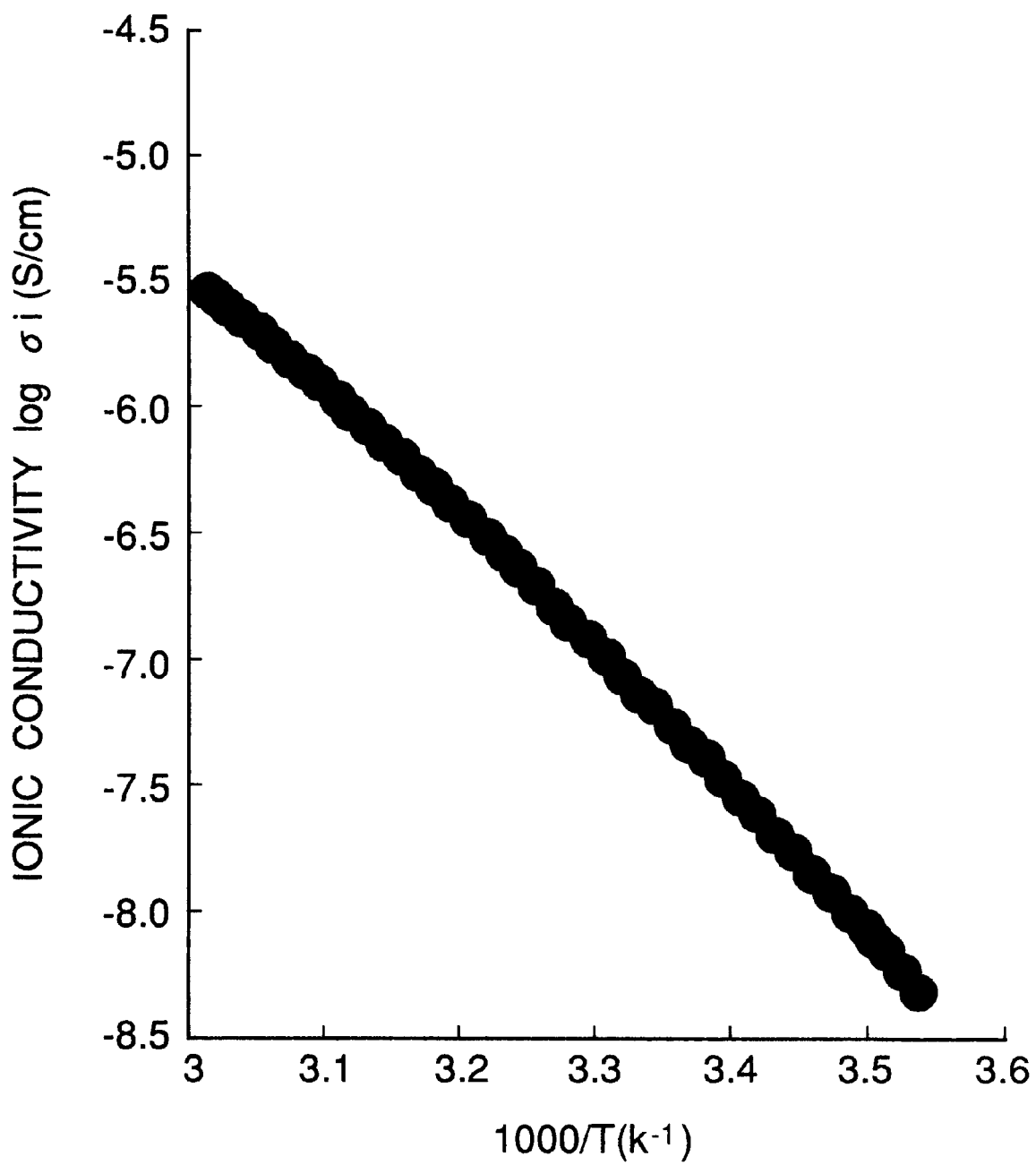
FIG. 11 is a diagrammatic view illustrating the temperature dependence of ionic conductivity of the electrolyte obtained in Example 9.

The molten salt polymer was analyzed for mobility based on a measurement of ionic conductivity by the complex impedance method and on thermal analysis with a differential scanning calorimeter. The temperature dependence of ionic conductivity thereof in a minute region is as shown in FIG. 11. The polymer had an ionic conductivity of $1.27 \times 10^{-7}$ S/cm at 30° C., showing that the mobility thereof was exceedingly high for its structure. The thermal analysis revealed that the polymer was amorphous in a wide temperature range of from $-150°$ C. to 200° C. and had a glass transition temperature as low as $-4.9°$ C. These and above results indicate that the formation of a molten salt in polymer side chains was effective in imparting high mobility.

EXAMPLE 10

In a mixed solvent prepared from 100 ml of water and 50 ml of acetone and containing 3.2 g of sodium hydroxide, 3.7 g of 2-aminoethanol was reacted with 12.5 g of trifluoromethanesulfonyl chloride at room temperature for 12 hours. The solvent was evaporated from the resultant reaction mixture by vacuum distillation. To the residue was added 50 ml of chloroform. The sodium chloride generated was removed by filtration. The resultant chloroform solution was distilled under vacuum to obtain 2-trifluoromethanesulfonamidoethanol. A 10 g portion was taken out of this reaction product and dissolved in 100 ml of acetone. Thereto was added dropwise 12.0 g of thionyl chloride over a period of 3 minutes. Subsequently, 10 ml of an aqueous solution containing 2.06 g of sodium hydroxide was added thereto dropwise to react the reactants at 55° C. for 12 hours. The solvent was removed from the resultant reaction mixture, and 100 ml of water was added to the residue. After this mixture was stirred, 100 ml of diethyl ether was added to conduct extraction.

The organic solvent layer was recovered, and the solvent was evaporated by vacuum distillation to obtain 1-chloro-2-trifluoromethanesulfonamide-ethane. A 10.0 g portion of this reaction product was dissolved in ethanol. This solution was reacted and neutralized with 20 ml of water containing 1.90 g of sodium hydroxide dissolved therein. The solvent was removed to obtain 1-chloro-2-sodium trifluoromethanesulfonamide-ethane. Subsequently, 10.26 g of this compound was mixed with 2.27 g of 1-vinylimidazole (2 times the amount of the imidazolium). The resultant mixture was reacted in 100 ml of acetonitrile at room temperature for 2 days. The solvent was evaporated by vacuum distillation, and the residue was dissolved in acetone. The sodium chloride generated was removed to obtain 1-vinyl-3-trifluoromethanesulfonamide-ethylimidazolium chloride. Thereto was added an equimolar amount of LiTFSI, followed by azobisisobutyronitrile in an amount of 0.15 g, which was 5 mol % based on the vinyl monomer. This mixture was radical-polymerized in 50 ml of ethanol at 65° C. for 3 hours to obtain a molten salt polymer represented by the following formula. The polymer obtained was a brown resin. It was ascertained by ascertaining the disappearance of the vinyl group by IR spectrometry that the polymerization reaction had proceeded.

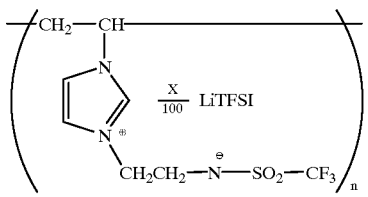

In the above formula, LiTFSI represents lithium bis(trifluoromethanesulfonylimide), X is 0 to 500, and n is 2 to 100.

The molten salt polymer had an ionic conductivity of $6.82 \times 10^{-5}$ S/cm at 30° C. and a glass transition temperature of −52° C. The polymer was thus found to have exceedingly high mobility at room temperature and be capable of functioning as an excellent ionic conductor.

EXAMPLE 11

In 100 ml of a 1:1 mixture of acetone and water were dissolved 20 g of 1-chloro-2-trifluoromethanesulfonamideethane and 2.0 g of 4(5)-vinylimidazole. Thereto was added 0.85 g of sodium hydroxide as an acid acceptor. This mixture was reacted in an autoclave at 50° C. for 7 days. The resultant reaction mixture was distilled under a reduced pressure at 80° C. for 4 hours to remove the solvent. Thereafter, 30 ml of acetone was added to the residue to completely dissolve the same. This solution was added dropwise to 300 ml of ether, and the precipitate generated was recovered. The precipitate was vacuum-dried at room temperature for 12 hours to obtain 1,3-di(trifluoromethanesulfonamide-ethyl)-4(5)-vinylimidazolium chloride. This compound was mixed in water with lithium hydroxide in an amount equivalent to the sulfonamide groups. The solvent was removed from the reaction mixture by vacuum distillation, and the residual reaction product was dissolved in 20 ml of ethanol. The NaCl precipitated was removed to obtain 1,3-di(trifluoromethanesulfonamide-ethyl)-4(5)-vinylimidazolium lithium.

Subsequently, azo(bisisobutyronitrile) was added in ethanol to the thus-obtained compound in an amount of 5 mol % based on the vinyl monomer to conduct radical polymerization at 60° C. for 3 hours. The solvent was evaporated from the reaction mixture by vacuum distillation. Thus, a molten salt polymer represented by the following formula was obtained, in which the lithium ions only were able to move:

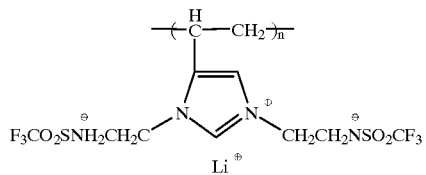

wherein n is 2 to 100.

The molten salt polymer had an ionic conductivity of $3.20 \times 10^{-6}$ S/cm at 30° C. and a glass transition temperature of −42° C. In the polymer, the lithium ions only were movable. The molten salt polymer was thus found to have exceedingly high mobility at room temperature.

EXAMPLE 12

To DMF were added 2.1 g of 1-ethylimidazole and 5.0 g of 2-chloroethanesulfonyl chloride. This mixture was stirred at room temperature for 12 hours. The resultant reaction mixture was concentrated under a reduced pressure and then added dropwise to ether to obtain 1-ethyl-3-chlorosulfonylethylimidazolium chloride as a reddish-brown substance. To this reaction product was added 20 g of a 10% aqueous poly(allylamine) solution, followed by 200 ml of water. The mixture was reacted at 100° C. for 2 days in the presence of NaOH in an amount equivalent to the amino groups. To the resultant reaction mixture was added 100 ml of ethanol. After this mixture was allowed to stand at 0° C., the yellow powder precipitated was recovered by centrifuging to obtain a poly[allylsulfonamide-ethyl(1-ethyl)imidazolium]. To the thus-obtained molten salt polymer was added LiTFSI. Thus, a polyelectrolyte represented by the following formula was obtained.

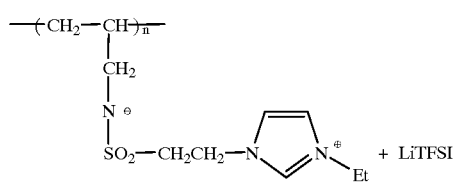

In the above formula, Et represents ethyl, LiTFSI represents lithium bis(trifluoromethanesulfonylimide), and n is 2 to 10,000.

The molten salt polymer had an ionic conductivity of $7.26 \times 10^{-6}$ S/cm at 30° C. and a glass transition temperature of −60.2° C. and showed excellent mobility at room temperature.

EXAMPLE 13

In 200 ml of dichloromethane was dissolved 6.88 g of 1,3-benzenedisulfonyl chloride. This solution was reacted with 200 ml of an aqueous solution containing 3.02 g of ethylenediamine and further-containing an acid acceptor (NaOH or $Na_2CO_3$) in an amount equivalent to the amino groups. Thus, a poly(sulfonamide) was synthesized by the interfacial method. The white fibrous compound obtained was washed with ethanol and vacuum-dried to obtain the poly(sulfonamide). This compound was reacted with LiOH in an aqueous solution to obtain its lithium salt. To the thus-obtained poly(sulfonamide lithium salt) was added an equivalent amount of each of 1-ethyl-3-methylimidazolium bromide, 1,2-dimethylimidazolium bromide, 1,2-dimethyl-3-ethylimidazolium bromide, and 1,2-dimethyl-3-ethylimidazolium bromide. The resultant mixtures were separately stirred in 30% aqueous methanol solution to obtain molten salt polymers represented by the following formula:

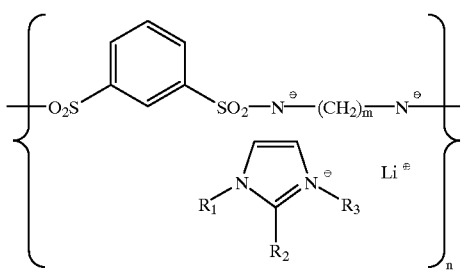

wherein $R_1$ and $R_3$ each represents a hydrogen atom, a methyl group, or an ethyl group; $R_2$ represents a hydrogen atom or a methyl group; m is 2 to 10; and n is 2 to 500.

The ionic conductivities at 30° C. and glass transition temperatures of the molten salt polymers containing lithium ions are shown in Table 2. All these polymers were thus found to have high mobility at room temperature and be capable of functioning as excellent ionic conductors.

TABLE 2

| Starting imidazolium derivative | Ionic conductivity (S/cm) | Glass transition temperature (° C.) |
| --- | --- | --- |
| 1-Ethyl-3-methyl derivative | $4.10 \times 10^{-4}$ | −62.0 |
| 1,3-Dimethyl derivative | $2.69 \times 10^{-3}$ | −49.4 |
| 1,2-Dimethyl-3-ethyl derivative | $8.22 \times 10^{-4}$ | −56.0 |
| 1,2-Dimethyl-3-propyl derivative | $5.03 \times 10^{-4}$ | −44.4 |

EXAMPLE 14

A NAFION (trade name: manufactured by E.I. du Pont de Nemours & Co., Inc.) membrane having sulfonic acid residues was immersed at room temperature for 24 hours in a homogeneous solution prepared by dissolving 22.0 g of 1,3-diethylimidazolium bromide and 19.2 g of lithium bis (trifluoromethanesulfonimide) [molar ratio of the former to the latter ingredient, 3:2] in 100 ml of acetonitrile. If desired, vacuum suction was conducted in order to rapidly infiltrate the solution into the membrane after initiation of the immersion. Subsequently, the thus-treated NAFION membrane was dried under mild conditions so as to avoid foaming. Thus, a thin lithium ion conductor film having interconnected molten-salt domains formed therein was obtained.

The film thus obtained had an ionic conductivity of $8.4 \times 10^{-3}$ S/cm at ropm temperature.

EXAMPLE 15

In place of the NAFION membrane having sulfonic acid residues used in Example 14, a NAFION (trade name: manufactured by E.I. du Pont de Nemours & Co., Inc.) membrane having carboxylic acid residues was immersed at room temperature for 24 hours in a homogeneous solution prepared by dissolving 22.0 g of 1,3-diethylimidazolium bromide and 19.2 g of lithium bis (trifluoromethanesulfonimide) in 100 ml of acetonitrile. Subsequently, the thus-treated NAFION membrane was dried under mild conditions so as to avoid foaming. Thus, a thin lithium ion conductor film having interconnected molten-salt domains formed therein was obtained.

The film thus obtained had an ionic conductivity of $4.2 \times 10^{-3}$ S/cm at room temperature.

EXAMPLE 16

A porous Teflon membrane [manufactured by Nippon Valqua Industries, Ltd., Japan; thickness, 100 μm; porosity, 60%] was immersed for 3 minutes in a solution prepared by dispersing sodium metal in liquid ammonia. This membrane was rinsed and then dried to obtain a Teflon membrane having carboxylic acid residues on the pore surface.

Subsequently, this Teflon membrane was immersed at room temperature for 24 hours in a homogeneous solution prepared by dissolving 22.0 g of 1,3-diethylimidazolium bromide and 19.2 g of lithium bis (trifluoromethanesulfonimide) in 100 ml of acetonitrile to incorporate the imidazolium salt derivative and the lithium bis(trifluoromethanesulfonimide) into the thin film. Subsequently, the thus-treated Teflon membrane was dried under mild conditions so as to avoid foaming. Thus, a thin film containing a molten salt was obtained.

The film thus obtained had an ionic conductivity of $2.1 \times 10^{-3}$ S/cm at room temperature.

EXAMPLE 17

Cation-exchange resin "DOWEX-50WX8-400" [manufactured by The Dow Chemical Co.; degree of crosslinking, 8%; particle diameter, 200–400 mesh] was treated with an aqueous sodium hydroxide solution to sufficiently convert the anion seats into a sodium salt form. This resin was rinsed with water and dried.

Subsequently, the thus-treated cation-exchange resin was placed in a homogeneous solution prepared by dissolving 22.0 g of 1,3-diethylimidazolium bromide and 19.2 g of lithium bis(trifluoromethanesulfonimide) in 100 ml of acetonitrile, and immersed therein with gentle stirring at room temperature for 6 hours. Thereafter, the resin was dried under mild conditions so as to avoid foaming to thereby form interconnected molten-salt domains within the particles and on the surface thereof.

The resin thus obtained was formed into pellets. The pellets obtained had an ionic conductivity of $2.7 \times 10^{-3}$ S/cm at room temperature.

EXAMPLE 18

Ninety grams of methyl acrylate was mixed with 10 g of divinylbenzene and 1 g of benzoyl peroxide with cooling. This solution was poured with stirring into 500 ml of purified water containing 0.1% poly(vinyl alcohol). The resultant solution was heated to 60° C. with stirring and refluxed for 15 hours to hydrolyze the ester side chains to thereby produce a sodium acrylate type poly(acrylic acid) resin. This resin was sufficiently dried.

Subsequently, the poly(acrylic acid) resin was placed in a solution prepared by completely dissolving 22.0 g of 1,3-diethylimidazolium bromide and 19.2 g of lithium bis (trifluoromethanesulfonimide) in 100 ml of acetonitrile, and immersed therein with gentle stirring at room temperature for 6 hours. Thereafter, the resin was dried mildly while avoiding foaming to thereby form interconnected molten-salt domains within the particles and on the surface thereof.

The resin thus obtained was solidified (compacted) under pressure. The compact obtained had an ionic conductivity of $4.8 \times 10^{-3}$ S/cm at room temperature.

EXAMPLE 19

Methyl methacrylate containing azobisisobutyronitrile as a polymerization initiator in an amount of 1% based on the methyl methacrylate was reacted in a methanol solvent at 50° C. for 4 hours. This reaction mixture was poured into ethyl acetate, and the resultant precipitate was washed and then re-dissolved in methanol. An aqueous sodium hydroxide solution was added thereto to conduct hydrolysis at 60° C. for 1 hour to thereby convert about 70% of the ester groups into a sodium carboxylate form. The resultant reaction mixture was concentrated by evaporation, and formed into a film on a Teflon plate (casting). This wet film was irradiated with gamma rays [radiation source, $^{60}$Co; Model Gamma-Cell 220, Type B] for about 10 minutes [total dose, 0.12 Mrad] while taking care not to dry the film. Thus, a porous film was obtained.

Subsequently, the porous film was immersed at room temperature for 24 hours in a homogeneous solution prepared by dissolving 22.0 g of 1,3-diethylimidazolium bromide and 19.2 g of lithium bis(trifluoromethanesulfonimide) in 100 ml of acetonitrile. The thus-treated film was dried under mild conditions so as to avoid foaming. Thus, a thin lithium ion conductor film having interconnected molten-salt domains formed therein was obtained; This film in a sufficiently dried state had an ionic conductivity of $4.2 \times 10^{-4}$ S/cm at room temperature.

EXAMPLE 20

Acrylic acid was mixed with 1% potassium persulfate in water. This mixture was stirred at 60° C. for 3 hours to polymerize the acid. After the resulting reaction mixture was concentrated, ethylene diamine and 1-ethyl-3-dimethylaminopropylcarbodiimide hydrochloride were added thereto in amounts of 3% and 8%, respectively, based on the acrylic acid. This mixture was formed (cast) on a Teflon film and then reacted at room temperature for 1 hour. The gel thus obtained was sufficiently washed with 0.01 N aqueous sodium hydroxide solution, subsequently pressed between metal plates, and then dried to obtain a film.

Subsequently, the film was immersed at room temperature for 24 hours in a homogeneous solution prepared by dissolving 22.0 g of 1,3-diethylimidazolium bromide and 19.2 g of lithium bis(trifluoromethanesulfonimide) in 100 ml of acetonitrile. The thus-treated film was dried at a low temperature so as to avoid foaming. Thus, a thin lithium ion conductor film having interconnected molten-salt domains formed therein was obtained. This film in a sufficiently dried state had an ionic conductivity of $5.8 \times 10^{-4}$ S/cm at room temperature.

EXAMPLE 21

Methyl acrylate was mixed with p-chloromethylstyrene in a molar ratio of 95:5 in benzene. Azobisisobutyronitrile as a polymerization initiator was added thereto in an amount of 1% based on the total monomer amount to react the monomers at 70° C. for 3 hours. To the resultant solution was added p-aminoaniline in an amount of 3% based on the total monomer amount. This mixture was reacted at 70° C. for 1 hour. Thereafter, the precipitate separated from the solution phase was collected, dried, pulverized to an appropriate particle diameter with a mortar, and then dispersed in 0.1 N aqueous sodium hydroxide solution to convert the ester groups to a sodium acrylate form.

Subsequently, the acrylic resin was immersed at room temperature for 24 hours in a homogeneous solution prepared by dissolving 22.0 g of 1,3-diethylimidazolium bromide and 19.2 g of lithium bis(trifluoromethanesulfonimide) in 100 ml of acetonitrile. The thus-treated resin was dried at a low temperature so as to avoid foaming. Thus, a lithium ion conduct or having molten-salt domains was obtained. This resin was sufficiently dried and then formed into pellets. The pelleted resin had an ionic conductivity of $1.8 \times 10^{-4}$ S/cm at room temperature.

According to the present invention, polyelectrolytes can be provided which stably have excellent mechanical properties and show high ionic conductivity at room temperature.

While the invention-has been described in detail and with reference to specific embodiments thereof, it will be apparent to one skilled in the art that various changes and modifications can be made therein without departing from the spirit and scope thereof.

What is claimed is:

1. A molten-salt polyelectrolyte comprising a molten salt polymer which is obtained by reacting an imidazolium derivative having a substituent at the 1- and 3-positions at least with an organic acid or an organic acid compound having an acid amide or acid imide bond, wherein at least one of said imidazolium derivative and said organic acid compound is a polymerizable monomer or a polymer.

2. The molten-salt polyelectrolyte as claimed in claim 1, wherein the molten salt polymer is a polymer which is obtained by reacting a 1,3-dialkylimidazolium halide with an acid monomer to produce a molten salt monomer and polymerizing the molten salt monomer.

3. The molten-salt polyclectrolyte as claimed in claim 2, wherein the acid monomer is at least one compound selected from the group consisting of acrylic acid, methacrylic acid and vinylsulfonic acid.

4. The molten-salt polyelectrolyte as claimed in claim 2, wherein the acid monomer is composed of a combination of at least one acid monomer selected from the group consisting of acrylic acid, methacrylic acid and vinylsulfonic acid, and an alkai metal salt of any of these acids.

5. The molten-salt polyelectrolyte as claimed in claim 1, wherein the molten salt polymer is a polymer obtained by reacting a 1,3-dialkylimidazolium halide with a polymer of at least one acid monomer selected from the group consisting of acrylic acid, methacrylic acid and vinylsulfonic acid.

6. The molten-salt polyelectrolyte as claimed in claim 1, wherein the molten salt polymer is a polymer which is obtained by reacting a 1,3-dialkyl-imidazolium halide with a lithium bis(trifluoromethanesulfonylimide) and mixing the resulting compound with an alkali metal salt of a poly (allyltrifluoromethanesulfonamine).

7. The molten-salt polyelectrolyte as claimed in claim 1, wherein the molten salt polymer is a polymer which is obtained by reacting at least one imidazolium derivative selected from the group consisting of 1-vinyl-3-alkylimidazolium halides, 1-vinyl-2,3-dialkylimidazolium halides and 1,3-dialkyl-4(5)-vinylimidazolium halides with at least one organic acid compound selected from the group consisting of a carboxylic acid, a sulfonic acid and a sulfonic acid compound to produce a molten salt monomer, and polymerizing the molten salt monomer.

8. The molten-salt polyelectrolyte as claimed in claim 1, wherein the molten salt polymer is a polymer obtained by reacting a polymer of at least one imidazolium derivative selected from the group consisting of 1-vinyl-3-alkylimidazolium halides, 1-vinyl-2,3-dialkylimidazolium halides and 1,3-dialkyl-4-(5)-vinylimidazolium halides with a polymer of at least one acid monomer selected from the group consisting of acrylic acid, methacrylic acid and vinylsulfonic acid.

9. The molten-salt polyelectrolyte as claimed in claim 1, wherein the molten salt polymer is a polymer obtained by reacting at least one imidazolium derivative selected from the group consisting of 1-vinyl-3-alkylimidazolium halides, 1-vinyl-2,3-dialkylimidazolium halides and 1,3-dialkyl-4 (5)-vinylimidazolum halides with a lithium bis (trifluoromethane-sulfonimide) and an alkali metal salt to produce a molten salt monomer, and poymerizing the molten salt monomer.

10. The molten-salt polyelectrolyte as claimed in claim 9, wherein the lithium bis(trifluoromethanesulfonimide) of more than an equivalent amount is added to the imidazolium derivative to make a free lithium bis (trifluoromethanesulfonimide) present in the molten salt polymer.

11. The molten-salt polyelectrolyte as claimed in claim 1, wherein the molten salt polymer is a polymer obtained by polymerizing a 1-vinyl-3-trifluoromethanesulfonamideethylimidazolium in the presence of a lithium bis (trifluoromethanesulfonimide).

12. A molten-salt polyelectrolyte comprising a molten salt polymer obtained by polymerizing a lithium salt of a 1,3-di(trifluoromethanesulfonamide-ethyl)-4(5)-vinylimidazolium.

13. A molten-salt polyelectrolyte comprising a molten salt polymer obtained by reacting a 1-alkyl-3-halogenosulfonylethylimidazolium halide with a poly(allylamine).

14. The molten-salt polyelectrolyte as claimed in claim 1, wherein the molten salt polymer is a polymer obtained by reacting a poly(sulfonamide) lithium salt with at least one imidazolium halide compound selected from the group consisting of 1,3-dialkylimidazolium halides, 1,2,3-trialkylimidazolium halides, 1-vinyl-3-alkylimidazolium halides, 1-vinyl-2,3-dialkylimidazolium halides and 1,3-dialkyl-4(5)-vinylimidazolium halides, or a poly(imidazolium halide) as a polymer of thereof.

15. A molten-salt polyelectrolyte produced by infiltrating an imidazolium derivative into at least one organic acid compound selected from the group consisting of a polymeric acid and a polyanionic resin obtained by incorporating negative charges into a solid porous polymer or a thin polymer film, and reacting them.

16. A molten-salt polyelectrolyte produced by infiltrating an imidazolium derivative and a lithium salt into at least one organic acid compound selected from the group consisting of a polymeric acid and a polyanionic resin obtained by incorporating negative charges into a solid porous polymer or a thin polymer film, and reacting them.

* * * * *